(12) United States Patent
Tolpin et al.

(10) Patent No.: US 10,452,847 B2
(45) Date of Patent: Oct. 22, 2019

(54) SYSTEM CALL VECTORIZATION

(71) Applicant: PAYPAL, INC., San Jose, CA (US)

(72) Inventors: David Tolpin, Beer Sheva (IL); Michael Dymshits, Holit (IL)

(73) Assignee: PayPal, Inc., San Jose, CA (US)

( * ) Notice: Subject to any disclaimer, the term of this patent is extended or adjusted under 35 U.S.C. 154(b) by 113 days.

(21) Appl. No.: 15/268,278

(22) Filed: Sep. 16, 2016

(65) Prior Publication Data
US 2018/0082060 A1    Mar. 22, 2018

(51) Int. Cl.
*G06F 21/56* (2013.01)
*G06F 21/55* (2013.01)
*H04L 29/06* (2006.01)

(52) U.S. Cl.
CPC .............. *G06F 21/56* (2013.01); *G06F 21/55* (2013.01); *G06F 21/552* (2013.01); *G06F 21/554* (2013.01); *G06F 21/566* (2013.01); *H04L 63/14* (2013.01); *H04L 63/1408* (2013.01); *G06F 2221/034* (2013.01); *H04L 63/1416* (2013.01); *H04L 63/1425* (2013.01)

(58) Field of Classification Search
CPC .. H04L 63/14–63/1425; H04L 63/1416; G06F 21/50; G06F 21/55–21/554; G06F 21/56–21/566
See application file for complete search history.

(56) References Cited

U.S. PATENT DOCUMENTS

| | | | | |
|---|---|---|---|---|
| 9,860,262 | B2* | 1/2018 | Mainieri | G06N 7/005 |
| 2004/0205474 | A1* | 10/2004 | Eskin | H04L 63/1416 |
| | | | | 713/188 |
| 2008/0120720 | A1* | 5/2008 | Guo | G06F 21/552 |
| | | | | 726/23 |
| 2016/0078225 | A1* | 3/2016 | Ray | G06F 21/554 |
| | | | | 726/23 |

* cited by examiner

*Primary Examiner* — Daniel B Potratz
*Assistant Examiner* — D'Arcy Winston Straub
(74) *Attorney, Agent, or Firm* — Haynes and Boone, LLP

(57) ABSTRACT

The systems and methods that detect malware from count vectors are provided. A count vector having multiple components is generated. The count vector tracks a number and types of system calls generated by a process. Each component in the count vector is mapped to a type of a system call that exists in an operating system. Multiple system calls generated by the process are received over a first time interval. Each system call is mapped to a component in the count vector. The count vectors are aggregated according to a second time interval into a vector packet. The vector packet is transmitted over a network to a malware detection system that uses the count vectors in the vector packet to determine whether the process is a malware process.

13 Claims, 10 Drawing Sheets

US 10,452,847 B2

SYSTEM CALL VECTORIZATION

TECHNICAL FIELD

The disclosure generally relates to detecting malware and more specifically to detecting malware by using count vectors generated from system calls.

BACKGROUND

In conventional malware detection systems, malware detection units are incorporated into a computing device. The malware detection units then monitor system calls issued by processes running on the computing device and detect malware based on the system calls.

Such malware detection systems, however, do not work when placed into a network environment. First, each process typically generates thousands of system calls per second. Thus, transmitting thousands of system calls generated every second by thousands of processes to a malware detection system located elsewhere on a network will overwhelm the network. Second, filtering system calls and transmitting a subset of filtered system calls over a network is not a solution because the malware detection system can misclassify malware based on a subset of system calls.

Figure 1:
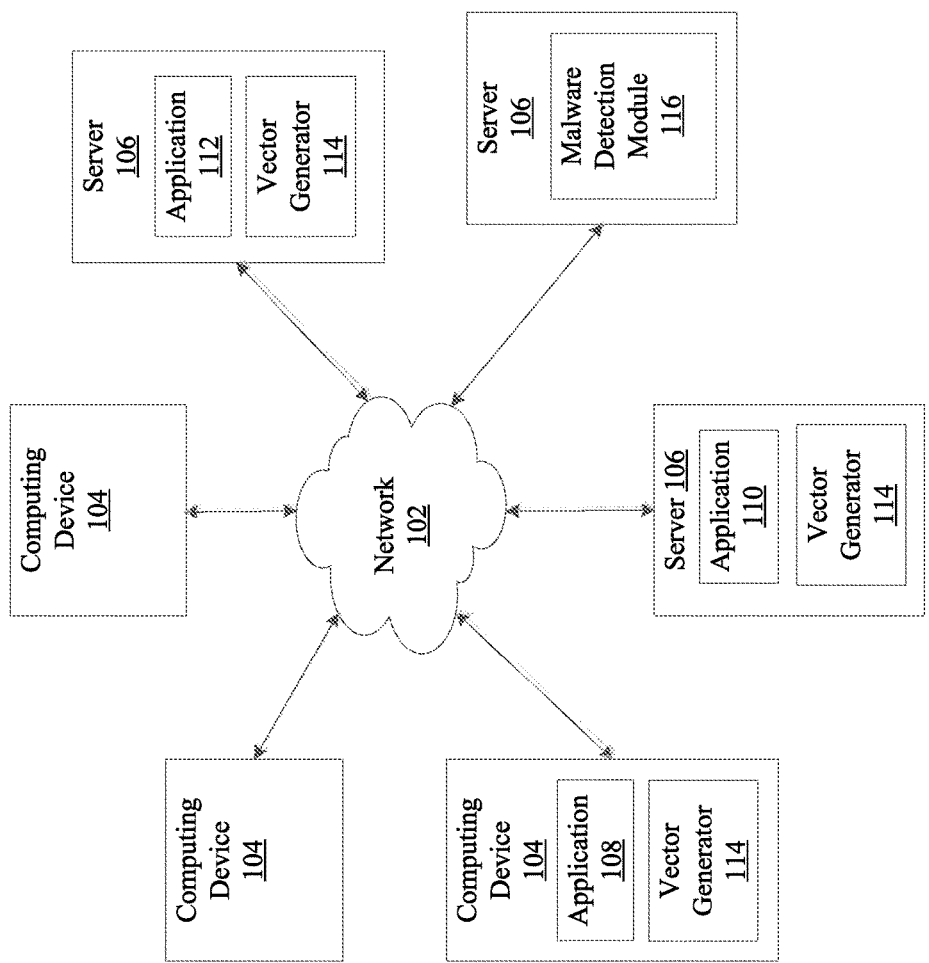
FIG. 1 is an exemplary system where a malware detection system can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The systems and methods provide a malware detection system that uses process traces aggregated into count vectors to detect or determine malware. Process traces are traces of system calls generated by a process executing on a computing device or a server. System calls are requests by the process to the operating system that executes on a computing device or a server for a system resource, such as processor time, memory access, etc.

In an embodiment, system calls generated by a process over a predefined time interval may be aggregated into count vectors. Each count vector may include system calls generated by a single process. Also, each count vector may be divided into a plurality of components, such that each component in the count vector maps to a system call type. Each component is also assigned a default value. As the process generates system calls during the predefined time interval, the value of the component that corresponds to a type of the system call is incremented by one. In this way, the count vector represents a number and types of system calls that a process generated over the predefined time interval.

In a further embodiment, multiple count vectors generated by a process over a second time interval are aggregated into a vector packet. The vector packet may also include a name of the process or another process identifier that is associated with the count vectors in the packet. Multiple vector packets may be generated for multiple processes that execute on computing devices in a network. Vector packets are transmitted over a network to a central malware detection module.

In an embodiment, the malware detection module uses process traces that are represented by count vectors in a vector packet to determine whether a process is or includes malware. The malware detection module may also be trained using machine learning to identify and classify processes based on past and current process traces. In one embodiment, the malware detection module may identify a summary representation of the process from the count vectors. The malware detection module may then classify a process as a malware process based on the summary representation. For instance, the malware detection module may identify a known malware processes, a malware process that masquerades as another process, or a new malware process.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

Various components that are accessible to network 102 may be computing devices 104 and servers 106. Computing devices 104 may be portable and non-portable electronic devices under control of a user and configured to transmit, receive, and manipulate data from servers 106. Example computing devices 104 include desktop computers, laptop computers, tablets, smartphones, wearable computing devices, eyeglasses that incorporate computing devices, implantable computing devices, etc.

Computing devices 104 may include one or more applications 108. Applications 108 may be pre-installed on the computing devices 104, installed on the computing devices 104 using portable memory storage devices, such as compact disks or thumb-drives, or be downloaded to the computing devices 104 from service provider server that may be one of servers 106, described below. Applications 108 may be executed on the computing devices 104 and receive instructions and data from a user, from servers 106, and/or from other computing devices 104.

Example applications 108 installed on computing devices 104 may be payment transaction applications. Payment transaction applications may be configured to transfer money world-wide, receive payments for goods and services, manage money spending, etc. Further, applications 108 may be under an ownership or control of a payment service provider, such as PAYPAL®, Inc. of San Jose, Calif., USA, a telephonic service provider, a social networking service provider, and/or other service providers. Applications 108 may also be analytics applications. Analytics applications perform business logic, provide services, and measure and improve performance of services and functions of other applications that execute on computing devices 104 based on current and historical data. In another embodiment, applications 108 may be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 108 may be location detection applications, such as a mapping, compass, and/or global positioning system (GPS) applications. Further, applications 108 may be social networking applications and/or merchant applications. In yet another embodiment, applications 108 may be service applications that permit a user of computing device 104 to receive, request and/or view information for products and/or services, and also permit the user to purchase the selected products and/or services.

In an embodiment, applications 108 may utilize numerous components included in computing device 104 to display, receive input, store data, and communicate with network 102. Example components are discussed in detail in FIG. 7.

As described above, servers 106 are also connected to network 102. An example server may be a computing device that includes hardware and software for large scale processing. In another example, server 106 may be a computer program installed on a computing device that provides services to applications 108 installed on multiple computing devices 104. In an embodiment, server 106 may be maintained by a service provider, such as PAYPAL®, a telephonic service provider, social networking service, and/or other service providers. In an embodiment, server 106 may also include or be coupled with applications 110. Applications 110 may be counterparts to applications 108 executing on computing devices 104. Applications 110 may receive, process, and transmit data for user requested products and/or services transmitted from applications 108. Thus, applications 110 may also be financial services applications configured to transfer money world-wide, receive payments for goods and services, manage money spending, etc. In an embodiment, applications 110 may also be security applications configured to implement client-side security features or programmatic client applications for interfacing with appropriate application programming interfaces (APIs) over network 102. In another embodiment, applications 110 may be communication applications that perform email, texting, voice, and instant messaging functions that allow a user to send and receive emails, calls, texts, and other notifications over network 102. In yet another embodiment, applications 110 may be location detection applications, such as a mapping, compass, and/or GPS applications.

In an embodiment, when application 108 transmits requests and/or data for different transactions to applications 110, applications 110 process these transactions. The transactions may be in a form of one or more messages that are transmitted over network 102. In a further embodiment, to process transactions requested by applications 108, application 110 may request payment via payment processing application 112. Application 112 may be on the same or different server 106 as application 110. For instance, the payment processing application 112 may receive transactions from applications 108 and/or applications 110 that cause the payment processing application 112 to transfer funds of a user using application 108 to a service provider associated with application 110.

In an embodiment, payment processing application 112 may be maintained by a payment provider, such as PAYPAL®, a merchant, financial services provider, credit card provider, bank, and/or other payment provider, which may provide user account services and/or payment services to a user.

In an embodiment, as applications 108, 110, and 112 process user requests, transactions, etc., malware may be installed within applications 108, 110, and/or 112 or on computing device 104 or server 106 that execute applications 108, 110, and/or 112. Malware may be a process or an application that may operate on computing device 104 or server 106 and that gathers information, obtains access to private computer resources, and user sensitive information. Malware may also disrupt normal functions of the computing device 104 by displaying unwanted advertisements, encrypting files, stealing information, spying on the users, extorting payment, sabotaging functionality of computing devices 104 or server 106, etc. Example malware may include computer viruses, computer worms, "Trojan horses," ransomware, spyware, adware, scareware, etc. Further, examples of known malware may include Regin, Stuxnet, CryptoLocker, etc. In an embodiment, malware may cause applications 108, 110, and/or 112 to conduct fraudulent transactions, access user data, transmit user data to unauthorized third parties, corrupt computer memory, etc.

One way to determine whether malware exists within or masquerades as applications 108, 110, and/or 112 is to monitor and analyze process traces generated by the applications 108, 110, and/or 112. Process traces may trace system calls generated by applications 108, 110, and/or 112. In an embodiment, to monitor and analyze system calls, FIG. 1 may include a malware detection system. The malware detection system may include a vector generator 114 and a malware detection module 116. The vector generator 114 may execute on computing devices 104 or servers 106 that operate applications 108, 110 and/or 112 and trace system calls generated by these applications. Because applications 108, 110 and/or 112 generate thousands of system calls each second, when vector generator 114 receives traces from applications 108, 110, and/or 112, vector generator 114 formats the traces into count vectors and transmits the count vectors to the malware detection module 116 over network 102. As will be described below, count vectors reduce the amount of the system call information that may otherwise be transmitted over network 102, while preserving the information included in the system calls that malware detection module 116 may use to identify malware.

In an embodiment, malware detection module 116 may operate on one of servers 106 in FIG. 1. In an embodiment, malware detection module 116 receives count vectors from multiple computing devices 104 and servers 106 over network 102 and uses the count vectors to identify malware.

Figure 2:
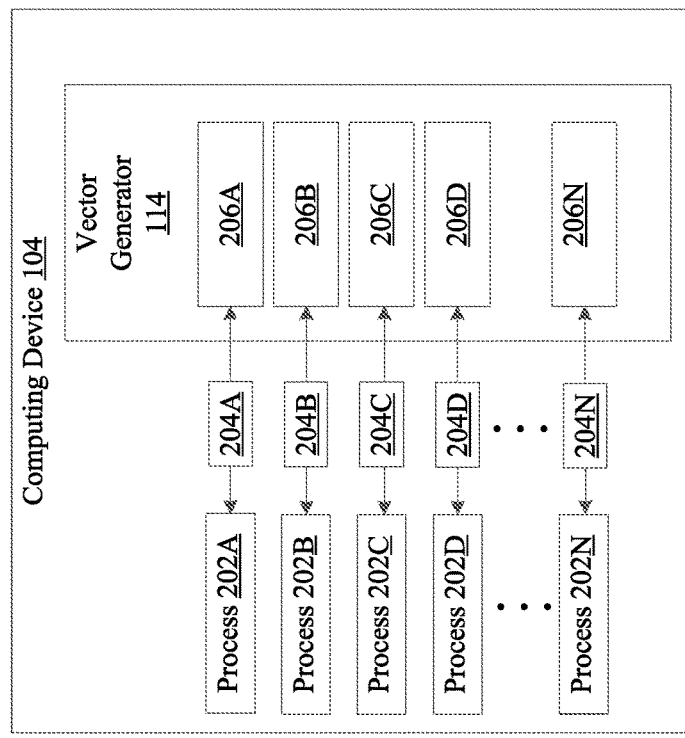
FIG. 2 is a block diagram of a vector generator, according to an embodiment.

FIG. 2 is a block diagram 200 that includes a vector generator 114, according to an embodiment. Although in FIG. 2, vector generator 114 executes within computing device 104, this embodiment is not limiting, and vector generator 114 may also execute on server 106 and the embodiments apply to applications 110 and 112. In an embodiment, as applications, such as applications 108, execute on computing devices 104, applications spawn processes 202A-N (collectively referred to as processes 202). There may be multiple processes 202 for each application or one process 202A per application 108.

As processes 202 execute, processes 202 generate system calls 204A-N (collectively referred to as system calls 204). For example, process 202A may generate system calls 204A, process 202B may generate system calls 204B, process 202C may generate system calls 204C, etc. System calls 204 may be requests to a kernel of an operating system that executes on computing device 104 that request system resources for the process. Example system calls 204 may include requests to schedule or initiate another process, file management access requests, device management access requests, information requests between an operating system and processes 202, communication requests, etc. Some exemplary system calls may include "exit," "fork," "read," "write," "open," and "close," though the implementation is not limited to these embodiments. Because each one of processes 202A-N may generate thousands of the respective system calls 204A-N each second, processes 202A-N may generate millions of system calls on computing device 104.

In an embodiment, malware detection system discussed in FIG. 1 may use process traces which include system calls 204 to determine malware that operates on computing device 104. However, because of the sheer volume of system calls 204 generated by processes 202 there is a need to extract information included in the system calls 204 efficiently and without losing or overlooking information that detects malware.

Because of the volume of system calls that are generated on each computing device 104, malware detection system includes vector generator 114. Vector generator 114 may be installed on each computing device 104 that executes processes 202. In an embodiment, vector generator 114 may trace system calls 204 generated by multiple processes 202. From the system call traces, vector generator 114 may generate count vectors 206A-N (collectively referred to as count vectors 206). Each count vector 206 represents system calls 204 generated by one of processes 202 over a configurable, predetermined time interval. For example, count vector 206A represents system calls 204A generated by process 202A, count vector 206B represents system calls 204B generated by process 202B, count vector 206C represents system calls 204C generated by process 202C, etc. In an embodiment, count vectors 206 preserve information included in the system calls 204 that were issued during the time interval, but reduce the amount of information transmitted between vector generator 114 and malware detection module 116 over network 102.

Figure 3A:
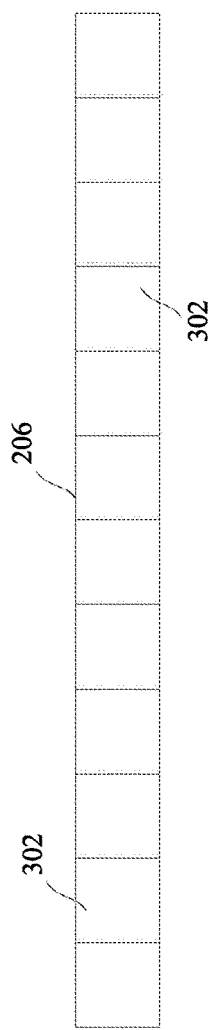
FIG. 3A is a block diagram of a count vector, according to an embodiment.

In an embodiment, count vector 206 may be a data structure. FIG. 3A is a block diagram 300A of a count vector, according to an embodiment. As illustrated in block diagram 300A, count vector 206 includes multiple components 302. In an embodiment, each component 302 or a position of each component 302 in count vector 206 may be mapped to a type of a system call that exists in the operating system. For instance, if the operating system includes six different types of system calls, count vector 206 may include six components 302, one component per system call type. That is, if the six types of system calls were "exit," "fork," "read," "write," "open," and "close," then each of these system calls would map to one of components 302 in count vector 206.

In a further embodiment, count vector 206 may also store other information related to system calls. For example, count vector 206 may store the names or identifiers of the file descriptors used to read from or write to files requested by the "read" and "write" system calls.

In an embodiment, the size of the count vector 206 may be the sum of the different types of system calls that exist in the operating system. For example, when the operating system includes 300 or more different types of system calls 204, the size of the count vector 206 may be 300. In another embodiment, the size of the count vector 206 may be the sum of the different types of system calls that exist in the operating system and other system call information (if any). In yet another embodiment, the size of the count vector 206 may be configurable and may be expanded as other types of system calls are added to the operating system or as vector generator 114 collects additional system call information from the system call traces.

Figure 3B:
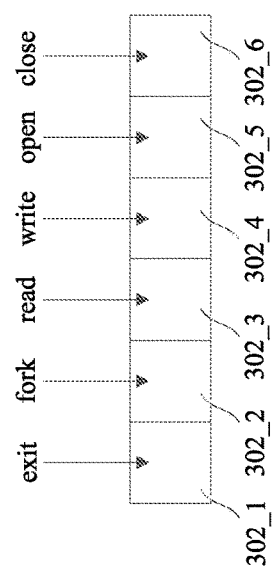
FIG. 3B is a block diagram of a count vector that maps a system call type to a component of the count vector, according to an embodiment.

FIG. 3B is a block diagram 300B of a count vector that maps a system call type to each component 302, according to an embodiment. As illustrated in FIG. 3B, system call "exit" is mapped to component 302_1, system call "fork" is mapped to component 302_2, system call "read" is mapped to component 302_3, system call "write" is mapped to component 302_4, system call "open" is mapped to component 302_5, and system call "close" is mapped to component 302_6.

Going back to FIG. 2, in an embodiment, count vector 206 tracks a number of system calls 204 that occur during a predefined time interval. Example time interval may be a second, two seconds, five seconds, etc., and may be configured within the malware detection system. The configuration may be based on system traffic, number of processes 202 executing on computing devices 104, number of system calls 204 issued by the processes 202, etc.

To track the number of system calls that occur during a predefined time interval, each component 302 may include a counter. The value of the counter represents a number of times a system call of the type mapped to the component 302 occurred during the time interval. The representation may be an integer or a real number, though the implementation is not limited to these embodiments. In an embodiment, the counter may be set to a default value, such as zero. The vector generator 114 then increments the counter each time the vector generator 114 receives a system call of the type that maps to the component 302 from process 202.

Figure 3C:
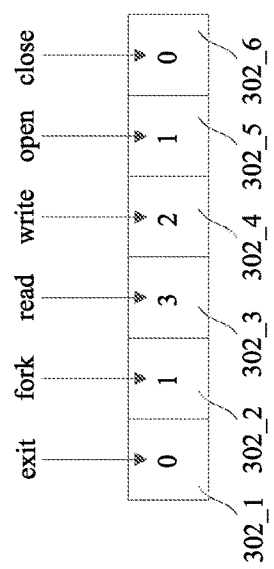
FIG. 3C-D are block diagrams of a count vector that maps a sequence of system calls to the count vector, according to an embodiment.

FIG. 3C is a block diagram 300C of a state of a count vector of FIG. 3B after the vector generator 114 receives system call traces from a process over a time interval, according to an embodiment. For instance, the vector generator 114 may receive system call traces for system calls 204 generated by process 202. The system call traces indicate that system calls "fork, open, read, write, read, write, read, write, read" were issued by process 202. From this system call trace, vector generator 114 may generate a count vector as shown in FIG. 3C. The count vector in FIG. 3C maps each system call to component 302 that is associated with the system call type. For example, component 302_1 associated with the system call "exit" remains set to zero, component 302_2 associated with the system call "fork" is set to one, component 302_3 associated with the system call "read" is set to three, component 302_4 associated with the system call "write" is set to two, component 302_5 associated with the system call "open" is set to one, and component 302_6 associated with the system call "close" remains set to zero.

Figure 3D:
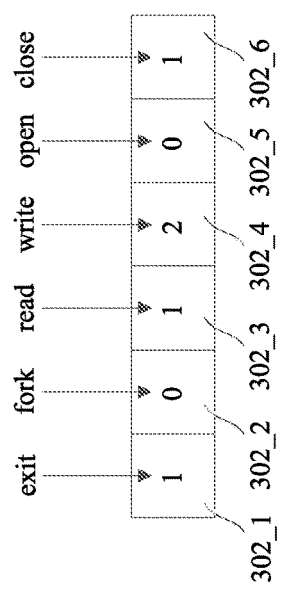

In an embodiment, vector generator 114 generates count vector 206 for system calls 204 generated by process 202 during each time interval. For example, during a second time interval, vector generator 114 may receive system call traces for system calls 204 generated by process 202 of FIG. 3C that includes a "write, read, write, close, exit" system calls. For this system call sequence, vector generator 114 may generate count vector 206 that maps each system call in the trace to the component in the count vector 206 as shown in FIG. 3D. For example, component 302_1 associated with "exit" is set to one, component 302_2 associated with "fork" remains set to zero, component 302_3 associated with "read" is set to one, component 302_4 associated with "write" is set to two, component 302_5 associated with "open" remains set to zero, and component 302_6 associated with "close" is set to one.

Going back to FIG. 2, as discussed above, vector generator 114 generates count vectors 206 for each process 202 during a predefined time interval. Each count vector 206 stores a representation of the number and types of system calls that were generated by the corresponding process 202A-N for that time interval. For example, system calls 204A generated by process 202A are mapped to count vector 206A, system calls 204B generated for process 202B are mapped to count vector 206B, system calls 204C generated for process 202C are mapped to count vector 206C, etc.

Figure 4:
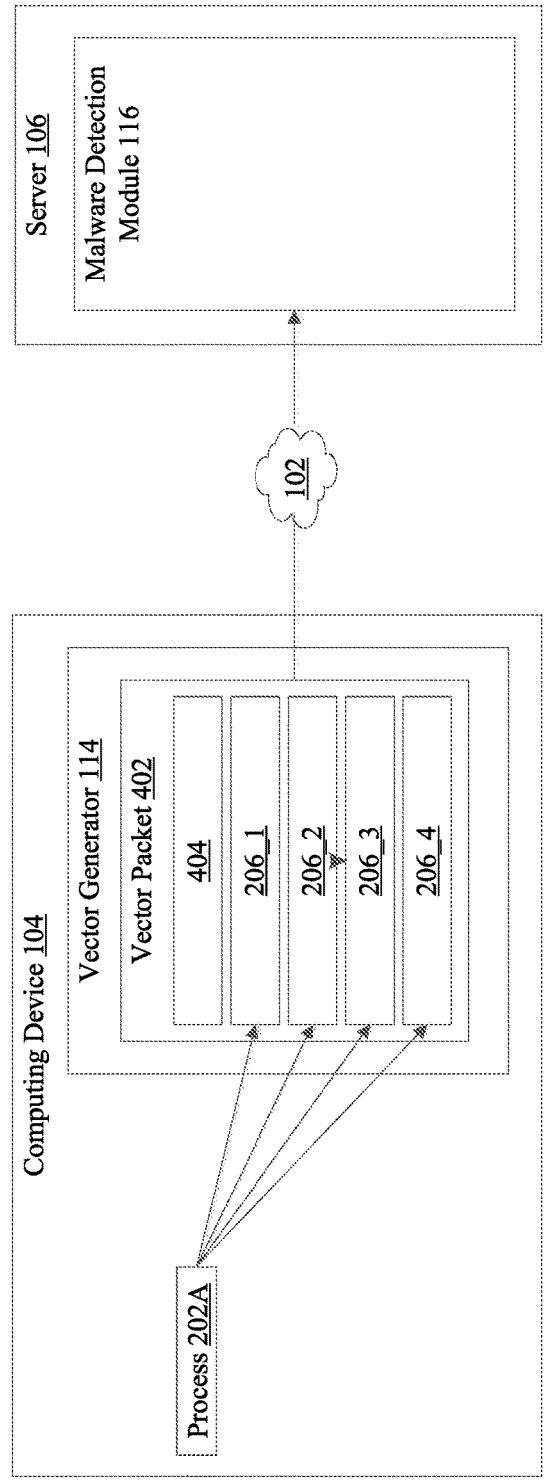
FIG. 4 is a block diagram of a vector generator transmitting count vectors to a malware detection module, according to an embodiment.

In an embodiment, once vector generator 114 generates count vectors 206, vector generator 114 transmits count vectors 206 to the malware detection module 116. FIG. 4 is a block diagram 400 of a vector generator 114 transmitting count vectors 206 to the malware detection module 116. As shown in FIG. 4, process 202A generated four count vectors 206_1, 206_2, 206_3, and 206_4 over four time intervals. Although implementation shown in FIG. 4 transmits count vectors 206 generated by one of process 202, such as process 202A, the implementation may be applied to count vectors 206 generated for other processes 202, such as processes 202B-N, shown in FIG. 2.

In an embodiment, to transmit count vectors 206, vector generator 114 may generate a vector packet 402. Vector packet 402 may include count vector(s) 206 generated from system calls 204 of process 202 over one or more time intervals, such as count vectors 206_1, 206_2, 206_3, and 206_4 generated for process 202A. In an embodiment, vector packet 402 may also include a process identifier or a process name of process 202 that generated vectors 206, collectively referred to as a process ID 404. The vector generator 114 may retrieve the process ID from one of the arguments passed to a system call by process 202A. In a further embodiment, vector generator 114 may generate vector packet 402 every configurable time interval, such as 30 seconds, 60 seconds, etc., such that vector packet 402 includes multiple count vectors 206.

A person skilled in the art will appreciate that transmitting count vectors 206 using vector packets 402 is for illustrative purposes only, and that there are other embodiments for transmitting count vectors, such as transmitting count vectors 206 individually, or together with count vectors generated by other processes 202, that may also be used.

In an embodiment, once vector generator 114 generates vector packet 402, vector generator 114 causes the computing device 104 to transmit the vector packet 402 to the malware detection module 116.

Figure 5:
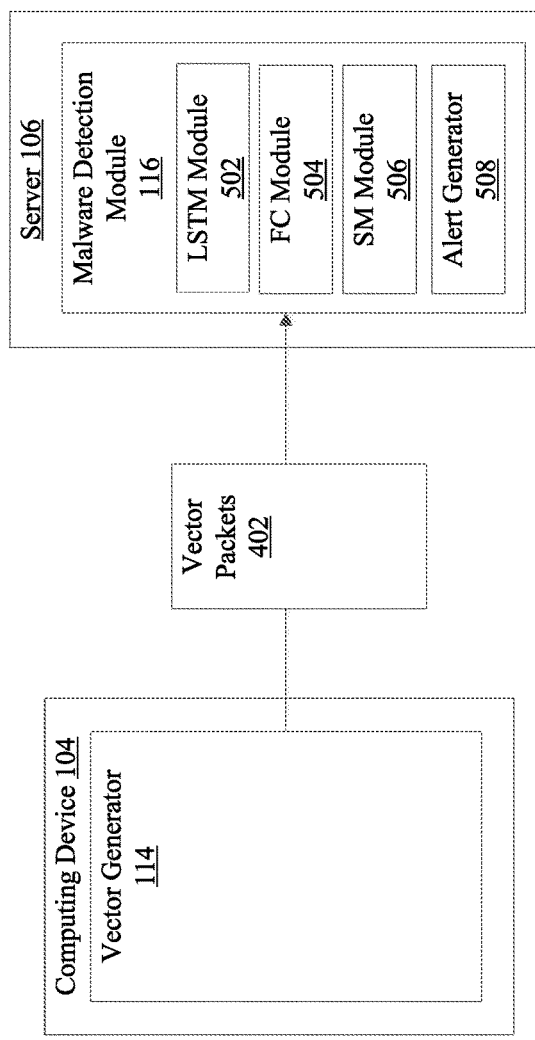
FIG. 5 is a block diagram of a malware detection module, according to an embodiment.

FIG. 5 is a block diagram of a malware detection module, according to an embodiment. Malware detection module 116 receives vector packets 402 from multiple computing devices 104, other servers 106, etc. Each vector packet 402 includes one or more count vectors 206 that represent system call information generated by one of processes 202.

In an embodiment, malware detection module 116 may include machine learning architecture that uses count vectors 206 to detect malware in or masquerading as process 202. Example machine learning architecture may include a long-short term memory network layer (referred to as a LSTM module 502), a fully connected network layer (referred to as a FC module 504) and a softmax readout layer (referred to as a SM module 506).

In an embodiment, LSTM module 502 retrieves a summary representation of process 202 from count vectors 206 included in vector packet 402. To extract the summary representation, LSTM module 502 may include numerous units and memory storage(s) that may store the state or output of the units (not shown). LSTM module 502 may also learn from previous data inputs regarding how to extract summary representations and which summary representations map to a particular process 202. In an embodiment, the summary representations extracted by the LSTM module 502 serve as input to the FC module 504.

In an embodiment, the FC module 504 processes the summary representations from the LSTM module 502. Based on the summary representations, FC module 504 determines a list of one or more process candidates that could have generated the summary representation of process 202. In an embodiment, the SM module 506 receives the output from the FC module 504 and applies a probability classifier to the processes in the process list. The probability classifier determines a probability that the processes in the process list generated by the FC module 504 are process 202. Depending on whether the processes in the process list map to the process ID 404 or are processes known to the SM module 506 as malware processes, SM module 506 determines whether process 202 that generated count vectors 206 includes or is malware.

In an embodiment, prior to processing process traces included in vector packets 402, malware detection module 116 may be trained. In an embodiment, the training includes two phases. The first phase may be pre-training, during which LSTM module 502, FC module 504, and SM module 506 learn to classify processes 202 from count vectors 206 generated by a number of well-known processes for which abundance of process traces in count vector or another format exist and are available. In an embodiment, during the pre-training phase, LSTM module 202 extracts summary representations from the process traces of the well-known processes. The summary representation may include counters of different components 302 in count vectors 206. Once LSTM module 502 module extracts the summary representation from the process traces, the LSTM module 502 forwards the summary representation of the well-known processes to FC module 504 and the SM module 506. In an embodiment, during the pre-training phase, the FC module 504 and SM module 506 classify the well-known processes based on the summary representations. In an embodiment, the pre-training phase may last until LSTM module 502, FC module 504 and the SM module 506 misclassify the well-known processes at a level that is below a predefined threshold. Once the misclassification reaches a level that is below a predefined threshold, the pre-training phase may be complete.

In an embodiment, after the pre-training phase is complete, the malware detection module 116 enters the incremental training phase. The incremental training phase may be concurrent with the malware detection module 116 identifying malware in processes 202. Prior to the incremental training phase and, in one embodiment, at the conclusion of the pre-training phase, the LSTM module 502 may be fixed to identify summary representations of processes 202. During the incremental training phase, the FC module 504 and SM module 506 may be trained incrementally on well-known processes for which an abundance of process traces is not available to qualify for the pre-training phase, on known malicious processes for which also an abundance of process traces is not available and on count vectors 206 that malware detection module 116 received from vector generators 114. The training includes classifying the well-known processes, processes 202, and malicious processes as malicious or benign processes. In an embodiment, the incremental phase may be concurrent with the malware detection module 116 identifying processes 102 from count vectors 206.

In an embodiment, after the malware detection module 116 is trained, malware detection module 116 may use process traces to determine whether one or processes 202 is a new process, a masquerade process, or a non-grata process. In an embodiment a new process may be a benign process that has not yet been classified by the malware detection module 116 because malware detection module 116 has not previously received count vectors 206 or a sufficient number of count vectors 202 for the process to determine the process's summary representation or to classify the process as one or process 202. In this case, the FC module 504 and the SM module 506 may not be able to properly classify the new process as a benign process or a malicious process. In an embodiment, when malware detection module 116 identifies the process as the new process, the malware detection module 116 does not need to know or use the process ID 404 of process 202.

In an embodiment, a masquerade process is a process whose process traces are associated with one process ID 404 but that FC module 504 and the SM module 506 classify the process under a different name or process ID. As described above, SM module 506 determines a probability that processes in the process list identified as process 202 candidates by FC module 504 as are indeed process 202. To identify whether process 202 is a masquerade process, SM module 506 may associate process IDs with each process in the process list and sort the process IDs according to the probability values. In an embodiment, process 202 may be deemed as a masquerade process when the process ID 404 of the process 202 transmitted from vector generator 114 is not included in the top predefined number of process IDs associated with the processes in the process list.

In an embodiment, a non-grata process may be a process that malware detection module 116 has identified as a malicious process. For example, during pre-training, LSTM module 502 may be trained to identify summaries representations of known malicious processes, and FC module 504 and SM module 506 may be used to classify these processes as malicious. In this way, when malware detection module 116 receives count vectors 206 for one of process 202, malware detection module 116 may classify the process 202 as a known malicious process when the classification of process 202 matches one of known malicious processes.

In an embodiment, malware detection module 116 also includes an alert generator 508. The alert generator 508 generates an alert when malware detection module 116 identifies a novel process, a masquerade process, or a non-grata process. In a further embodiment, alert generator 508 may also determine when to generate an alert. For example, alert generator 508 may generate an alert when a frequency of alerts regarding a novel process, a masquerade process and/or a non-grata process from a particular computing device 104 or server 106 reaches an alert threshold. In an embodiment, alert generator 508 may indicate the process ID 404 of processes 202 identified by the malware detection module 116, the computing device 104 or server 106 that generated the process and the name of the known malware program when the process is the non-grata process. Additionally, the alert generator 508 may also indicate other signs that computing device 104 or server 106 has been compromised.

Figure 6:
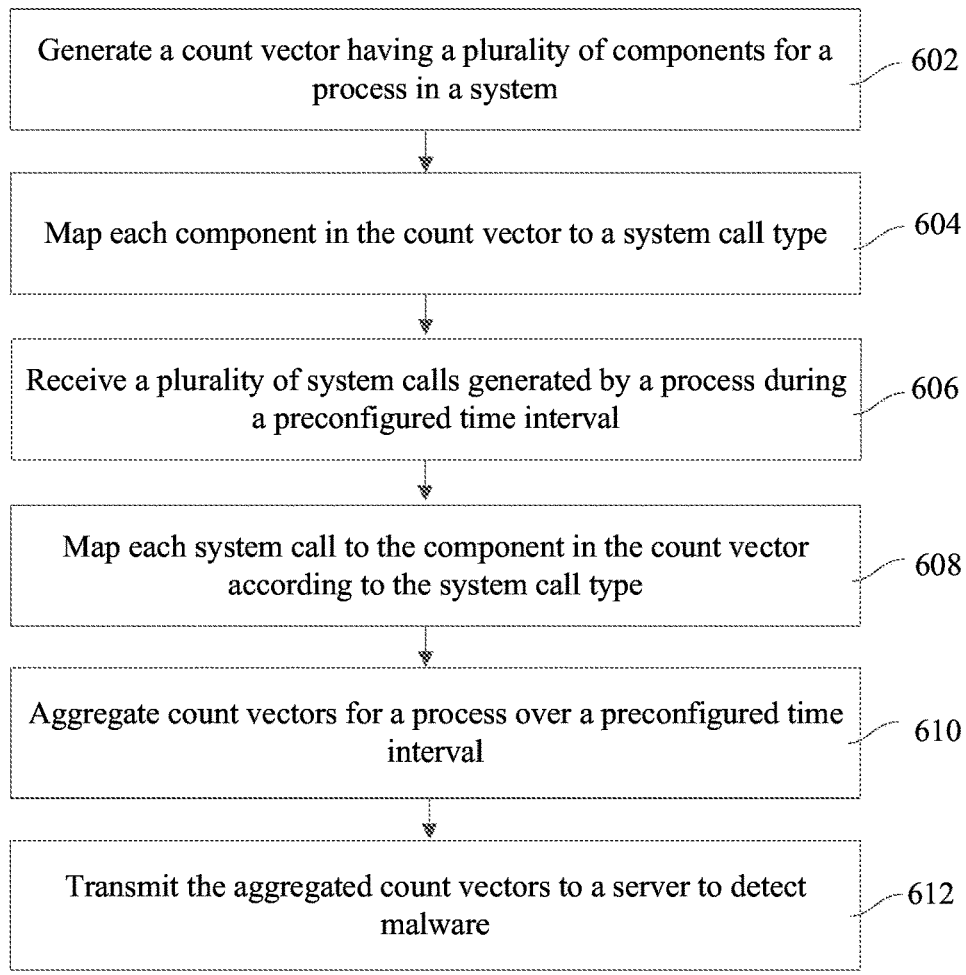
FIG. 6 is a flowchart of a method for generating a count vector, according to an embodiment.

FIG. 6 is a flowchart of a method 600 for generating a count vector, according to an embodiment. Method 600 may be performed using hardware and/or software components described with respect to FIGS. 1-5. Note that one or more of the operations may be deleted, combined, or performed in a different order as appropriate.

At operation 602, a count vector is generated. For example, vector generator 114 generates a count vector 206 with multiple components 302. As discussed above, each component may be mapped to a type of a system call that may be processed by the operating system of computing device 104 that hosts vector generator 114. Further, vector generator 114 may initialize the counter of each component 302 to zero or another default value.

At operation 604, a system call type is mapped to a component of the count vector. For example, vector generator 114 may map each system call type to a particular component 302 or a position of component 302 in the count vector 206. For example, a system call of type "exit" may be mapped to the first component and a system call of type "fork" may be mapped to a second component of count vector 206 as illustrated in FIG. 3C.

At operation 606, system calls generated by a process are received. For example, vector generator 114 receives system calls 204 generated by process 202. In an embodiment, system calls 204 that are included in each count vector 206 associated with process 202 are received during a predefined time interval, such as during a second or two-second time interval.

At operation 608, system calls received in operation 606 are mapped into a count vector according the system call type. For example, vector generator 114 maps each system call 204 received in operation 606 into component 302 of count vector 206 that is associated with the type of the system call 204. As part of the mapping, vector generator 114 may increment the counter of component 302. At the end of operation 608, the counter of each component 302 may store the number of times process 202 generated system calls 204 of a particular type during the predefined time interval.

At operation 610, count vectors are aggregated into a vector packet. For example, count vectors 206 generated in operations 602-608 are aggregated into vector packet 402 over a second preconfigured time interval. Example preconfigured time interval may be ten or thirty seconds, such that vector packet 402 includes multiple count vector 206. Additionally, vector packet 402 may also include a process ID 404 of process 202 that generated count vectors 206 in vector packet 402.

At operation 612, vector packet is transmitted to malware detection module. For example, vector generator 114 causes computing device 104 or server 106 that hosts vector generator 114 to transmit vector packet 402 to malware detection module 116.

Figure 7:
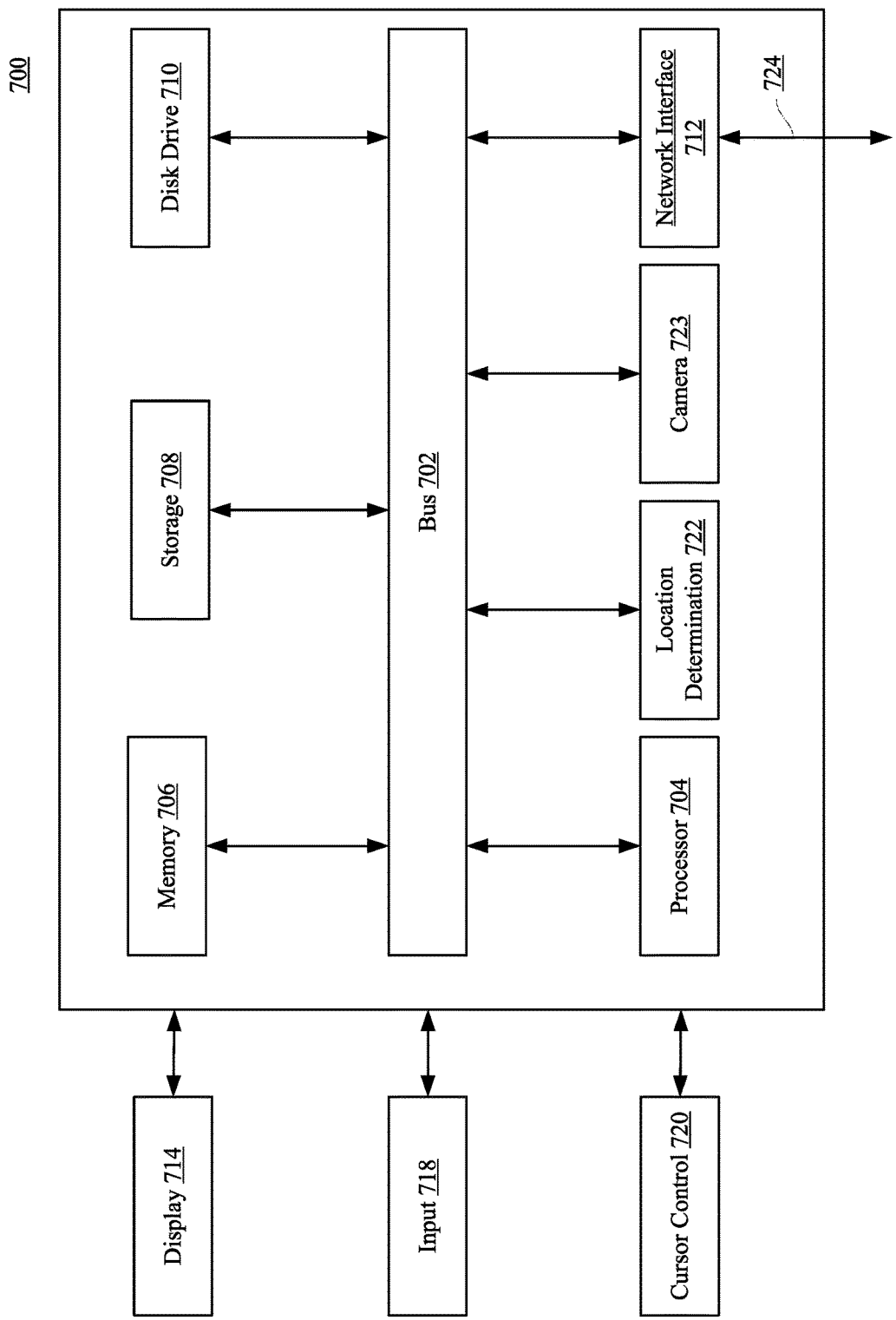
FIG. 7 is a block diagram of a computer system suitable for implementing one or more components in FIGS. 1-6, according to an embodiment.

Referring now to FIG. 7 an embodiment of a computer system 700 suitable for implementing, the systems and methods described in FIGS. 1-6 is illustrated.

In accordance with various embodiments of the disclosure, computer system 700, such as a computer and/or a server, includes a bus 702 or other communication mechanism for communicating information, which interconnects subsystems and components, such as a processing component 704 (e.g., processor, micro-controller, digital signal processor (DSP), graphics processing unit (GPU), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722 (e.g., a Global Positioning System (GPS) device as illustrated, a cell tower triangulation device, and/or a variety of other location determination devices known in the art), and/or a camera component 723. In one implementation, the disk drive component 710 may comprise a database having one or more disk drive components.

In accordance with embodiments of the disclosure, the computer system 700 performs specific operations by the processor 704 executing one or more sequences of instructions contained in the memory component 706, such as described herein with respect to the mobile communications devices, mobile devices, and/or servers. Such instructions may be read into the system memory component 706 from another computer readable medium, such as the static storage component 708 or the disk drive component 710. In other embodiments, hard-wired circuitry may be used in place of or in combination with software instructions to implement the disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 700. In various other embodiments of the disclosure, a plurality of the computer systems 700 coupled by a communication link 724 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
    a non-transitory memory storing instructions; and
    one or more hardware processors coupled to the non-transitory memory and configured to read the instructions from the non-transitory memory to cause the system to perform operations comprising:
        generating a first count vector and a second count vector, wherein the first count vector tracks numbers and types of system calls generated by a process over a first time interval and the second count vector tracks numbers and types of system calls generated by the process over a second time interval;

mapping components in the first count vector and the second count vector to the types of the system calls;

receiving a plurality of system calls generated by the process over the first time interval and the second time interval;

mapping each system call from the plurality of system calls received in the first time interval to a component of the components in the first count vector and each system call in the plurality of system calls received over the second time interval to the second count vector;

generating a vector packet that includes a process identifier for the process, the first count vector and the second count vector, wherein the process identifier is retrieved from an argument passed to one of the system calls by the process; and transmitting the vector packet to a malware detection module, wherein the malware detection module determines whether the process is a malware process based on the first count vector and the second count vector in the vector packet.

2. The system of claim 1, wherein generating the first count vector comprises:

setting a counter for each component to a default value.

3. The system of claim 2, wherein mapping each system call further comprises:

incrementing a counter of the component mapped to a type of the system call in the first count vector when the system call in the plurality of system calls is received during the first time interval.

4. The system of claim 1, wherein the operations further comprise:

determining a size of the first count vector as a size of a number of system call types.

5. A method, comprising:

generating a first count vector and a second count vector, wherein the first count vector tracks system calls generated by a process over a first time interval and the second count vector tracks system call generated by the process over a second time interval;

mapping components in the first count vector and the second count vector to types of a system call;

receiving a plurality of system calls generated by the process over the first time interval and the second time interval;

mapping each system call from the plurality of system calls in the first time interval to a component of the components in the first count vector and each system call in the plurality of system calls received over the second time interval to the second count vector;

generating a vector packet that includes a process identifier associated with the process that generated system calls for which counts are included in the first count vector and the second count vector, the first count vector and the second count vector, wherein the process identifier is retrieved from an argument passed to one of the system calls by the process; and transmitting the vector packet to a malware detection module, whereby the malware detection module determines whether the process is a malware process based on the first count vector and the second count vector in the vector packet.

6. The method of claim 5, wherein the process identifier is a name of the process that generated the system call.

7. The method of claim 5, wherein generating the first count vector comprises:

setting a counter for each component to a default value; and incrementing a counter of the component mapped to a type of the system call when the system call in the plurality of system calls is received.

8. The method of claim 5, further comprising:

determining a size of the first count vector as a size of a number of system call types.

9. A non-transitory machine-readable medium having stored thereon machine-readable instructions executable to cause a machine to perform operations comprising:

generating a first count vector and a second count vector, wherein the first count vector tracks numbers and types of system calls generated by a process over a first time interval and the second count vector tracks numbers and types of system calls generated by the process over a second time interval;

mapping components in the first count vector and the second count vector to the types of the system calls;

receiving a plurality of system calls generated by the process over the first time interval and the second time interval;

mapping each system call from the plurality of system calls received in the first time interval to a component of the components in the first count vector and each system call in the plurality of system calls received over the second time interval to the second count vector;

generating a vector packet that includes a process identifier for the process, the first count vector and the second count vector, wherein the process identifier is retrieved from an argument passed to one of the system calls by the process; and transmitting the vector packet to a malware detection module, whereby the malware detection module determines whether the process is a malware process based on the first count vector and the second count vector in the vector packet.

10. The non-transitory machine-readable medium of claim 9, wherein the process identifier is a name of the process that generated the system call.

11. The non-transitory machine-readable medium of claim 9, wherein generating the first count vector comprises:

setting a counter for each component to a default value.

12. The non-transitory machine-readable medium of claim 9, wherein generating the first count vector comprises:

incrementing a counter of the component mapped to a type of the system call when the system call in the plurality of system calls is received.

13. The non-transitory machine-readable medium of claim 9, wherein the operations further comprise:

determining a size of the first count vector as a size of a number of system call types.

* * * * *